United States Patent
Wang et al.

(10) Patent No.: US 6,414,980 B1
(45) Date of Patent: Jul. 2, 2002

(54) LASER ROD THERMALIZATION

(75) Inventors: Charles Xiaoyi Wang, Santa Clara; Acle V. Hicks, Cupertino; Edward C. Rea, Jr., Palo Alto, all of CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 09/416,354

(22) Filed: Oct. 12, 1999

(51) Int. Cl.[7] .................................................. H01J 3/05
(52) U.S. Cl. .......................................... 372/92; 372/93
(58) Field of Search ..................................... 372/92, 93

(56) References Cited

U.S. PATENT DOCUMENTS

| | | | |
|---|---|---|---|
| 3,806,829 A | 4/1974 | Duston et al. | 331/94.5 |
| 4,337,442 A | 6/1982 | Mauck | 372/13 |
| 4,412,330 A | 10/1983 | Mauck et al. | 372/29 |
| 4,630,275 A | 12/1986 | Rapoport | 372/13 |
| 5,023,886 A | 6/1991 | Hobart et al. | 372/99 |
| 5,151,909 A | 9/1992 | Davenport et al. | 372/22 |
| 5,225,051 A | 7/1993 | Poa et al. | 204/64 R |
| 5,291,505 A | 3/1994 | Nielsen | 372/38 |
| 5,321,715 A | 6/1994 | Trost | 372/69 |
| 5,339,323 A | 8/1994 | Hunter et al. | 372/25 |
| 5,363,387 A | 11/1994 | Sinofsky | 372/15 |
| 5,406,577 A | 4/1995 | Gagosz | 372/69 |
| 5,422,899 A | 6/1995 | Freiberg et al. | 372/25 |
| 5,498,935 A | 3/1996 | McMahan et al. | 315/241 P |
| 5,644,585 A | 7/1997 | Mitchell et al. | 372/25 |
| 5,812,569 A | 9/1998 | Walker et al. | 372/30 |
| 5,912,912 A | 6/1999 | Caprara et al. | 372/25 |
| 5,982,790 A | 11/1999 | Grossman et al. | 372/30 |
| 6,038,240 A * | 3/2000 | Deutsch et al. | 372/25 |
| 6,038,241 A | 3/2000 | von Elm et al. | 372/30 |
| 6,193,711 B1 * | 2/2001 | Connors et al. | 606/12 |

FOREIGN PATENT DOCUMENTS

| | | | |
|---|---|---|---|
| DE | 197 05 330 | 2/1997 | H01S/3/102 |
| EP | 0 918 383 | 10/1998 | H01S/3/11 |
| GB | 1 601 355 | 10/1981 | |
| JP | 55085088 | 6/1980 | H01S/3/11 |
| WO | WO 96/41577 | 12/1996 | A61B/17/36 |

OTHER PUBLICATIONS

U.S. Patent Application No. 08/991,217, filed Dec. 12, 1997, entitled: Rapid Pulsed Er:YAG Laser.
U.S. Patent Application No. 09/145,686, filed Sep. 20, 1998, entitled: Pulsed–Laser with First–Pulse Control.

* cited by examiner

*Primary Examiner*—Paul Ip
*Assistant Examiner*—Jeffrey Zahn
(74) *Attorney, Agent, or Firm*—Stallman & Pollock LLP

(57) ABSTRACT

A method for operating an extracavity frequency-converted solid-state laser for performing a laser processing operation is disclosed. The laser has a laser-resonator including an optically-pumped gain-medium. The resonator is configured to compensate for a predetermined range of thermal lensing in the gain-medium. An optically-nonlinear crystal located outside the resonator converts fundamental laser radiation delivered by the resonator into frequency converted radiation. The laser processing operation is performed by a train of pulses of the frequency-converted radiation having sufficient power to perform the processing operation. The power of frequency-converted radiation is dependent on delivery parameters of the laser radiation from the laser-resonator. The laser is operated in a manner which provides that the resonator delivers effectively the same average power of fundamental laser radiation before and during the laser processing operation. This provides that thermal-lensing in the gain-medium is within the predetermined range before and during a laser processing operation. Delivery parameters of the laser radiation before and during the processing operation are varied such that power of frequency-converted radiation generated before the processing operating is insufficient to perform a laser processing operation.

15 Claims, 6 Drawing Sheets

LASER ROD THERMALIZATION

TECHNICAL FIELD OF THE INVENTION

The present invention relates generally to continuously optically pumped, solid-state, repetitively-pulsed lasers. It relates in particular to stabilization of thermal-lensing in a solid-state gain-medium in a frequency-multiplied, repetitively-pulsed laser.

DISCUSSION OF BACKGROUND ART

Optically-pumped frequency-multiplied, repetitively-pulsed lasers are finding increasing use in laser material processing operations such as precision micromachining, marking, stereo lithography, and hard-disk texturing. One preferred laser type for this purposes is an extracavity frequency-tripled, pulsed, solid-state laser including a solid state gain-medium, such as Nd:YAG or Nd:YVO$_4$, which provides fundamental radiation at a wavelength of about 1.064 micrometers ($\mu$m). A detailed description of one example of such a laser can be found in U.S. Pat. No. 5,912,912 (Caprara et al.) assigned to the assignee of the present invention.

Such a laser is often designed to operate in a continuous repetitive pulsing mode at a selected pulse-repetition rate. In laser processing operations, however, the laser may be caused to deliver bursts or trains of pulses at this pulse-repetition rate for processing, with intervals between bursts when no processing occurs. The duration of such bursts depend on the processing operation. Intervals between bursts may vary, for example, according to time required to move a processing beam from one location to another on a workpiece being processed. It has been found that for short bursts of pulses, if the duration of the burst is not much greater, if at all, than the time required for the solid-state gain-medium to reach a thermal-lensing equilibrium a substantial change of thermal-lensing occurs during all, or some major portion, of a burst. Such a thermal-lensing change can lead to a variation in peak power of laser pulses and laser mode properties over the duration of the burst, which, in turn, can lead to imprecise processing operations.

Thermal-lensing is due to a spatial variation in refractive index of the solid-state gain-medium resulting from a thermal gradient in the gain-medium. This thermal gradient results, among other factors, from heating of the gain-medium by a portion of pump-light light power absorbed therein which is not extracted as laser radiation. Accordingly thermal-lensing is a function of, among other factors, pump-light power delivered to the solid-state gain-medium, and energy extracted from the gain-medium as laser radiation. In a repetitively pulsed laser, this extracted power is, in turn, dependent on the pulse-repetition rate. As described in the Caprara et al. patent, a laser-resonator can be variably configured to be adjustable for accommodating a range of equilibrium thermal-lensing effects resulting from operating the resonator at different powers and pulse-repetition rates. In operating such a laser to deliver pulse-trains or bursts (burst mode operation), a thermal-lensing change can occur as a result of a transition from a condition where no pulse is being delivered to a condition where a burst of pulses is delivered. This can occur either before a laser processing operation begins or from one pulse-burst to the next.

When no pulse-burst is being delivered, the gain-medium remains continuously pumped, but laser action is inhibited by operating an optical switch (Q-switch) which introduces a variable of controlled loss in the resonator of the laser. In one example, a Q-switch is arranged to be driven (rapidly opened and closed) during delivery of a pulse-burst by a modulated voltage applied to an acousto-optic or electro-optic crystal located in the resonator. The modulation frequency of which establishes the pulse-repetition rate.

When no pulses are being delivered, a maximum proportion of the pump-light power contributes to thermal-lensing. When a pulse-burst is being delivered some proportion of the pump-light power is extracted from the gain-medium as laser radiation. This reduces the temperature in the gain-medium and, correspondingly the thermal-lensing. This temperature-reduction occurs progressively over a time-period depending on the thermal inertia of cooling the gain-medium.

Because the resonator is adjusted to compensate for thermal-lensing when the rod reaches an equilibrium temperature (equilibrium thermal-lensing), the output power will progressively increase, once pulsing is initiated, reaching a maximum at equilibrium. Because of this, laser beam parameters such as mode-size and divergence and peak pulse-power will vary for at least an initial portion of the burst duration. This problem will be exacerbated when pulse-bursts are of different duration or have different durations therebetween, as may be required in a sequence of laser-processing operations. If pulse bursts are of shorter duration than time required to reach equilibrium the peak pulse power therein may fall short of the maximum possible for the resonator.

There is a need for a method of overcoming this peak power variation problem during a burst or repeated bursts of pulses.

SUMMARY OF THE INVENTION

The method of the present invention is directed to a method of operating a laser for performing a laser processing operation. The laser has a laser-resonator including an optically-pumped gain-medium. One or more optically-nonlinear crystals are located outside the resonator for converting laser radiation delivered by the resonator into frequency-converted radiation. The peak power of the frequency-converted radiation is dependent on delivery parameters of the laser radiation from the laser-resonator. The gain-medium exhibits a thermal-lensing effect on being optically pumped. The laser-resonator is configured to compensate for a predetermined range of the thermal-lensing. In one aspect, the method of the present invention comprises a first step of operating the laser to deliver laser radiation with delivery parameters thereof being such that frequency-converted radiation generated therefrom has insufficient peak power to perform the laser processing operation. In a second step, following this first step, the laser is operated to deliver laser radiation in the form of a train of pulses with delivery parameters thereof being such that pulses in a train of pulses of frequency-converted radiation generated therefrom have sufficient peak power to perform the laser processing operation. These may be defined as processing pulses. During the first and second steps, the laser is operated such that optical pumping power and average power of the laser radiation provide that the thermal-lensing effect is within the predetermined range for which the laser resonator is compensated.

Providing that the thermal-lensing effect is within the predetermined range during the first and second step ensures that there is no significant thermal-lensing change between intervals when processing pulses are being delivered and intervals when processing pulses are not being delivered. By this arrangement, at least the second and all other processing pulses in a train thereof have about the same peak power. By controlling loss in the resonator with a delay time before the initiation of a processing pulse train, i.e., between the first and second steps, the first pulse in the pulse-train can be controlled such that all processing pulses in the pulse-train have about the same power. Accordingly, the method of the present invention avoids the gradual increase in peak power that is experienced in pulse trains or bursts delivered by prior art lasers.

The above described first and second steps can be repeated such that frequency-converted radiation is generated as a sequence of trains of pulses having sufficient power to perform the processing operation having intervals therebetween in which insufficient frequency converted power is generated for the processing operation. Accordingly, the method of the present invention provides that the peak power of pulses in the trains of processing pulses can be maintained essentially constant independent of the duration of the trains of pulses.

In the first step, laser radiation may be delivered as a train of pulses having a higher pulse-repetition rate than that of the processing pulses in the second step. Alternatively, in the first step laser radiation may be delivered as continuous-wave (CW) radiation. Both of these options result in a lower peak power of laser radiation in the first step than the peak power of laser radiation in the second step.

In another aspect of the present invention, laser radiation delivered in the second step may be used directly for a processing operation for which the wavelength of the laser radiation is appropriate and which has a threshold for the operation which is dependent on peak power of the laser radiation. In this aspect of the method of the present invention, the first step includes operating the laser to deliver laser radiation having insufficient peak power to perform the laser processing operation. In a second step following this first step, the laser is operated to deliver laser radiation in the form of a train of pulses having sufficient peak power to perform the laser processing operation. During the first and second steps, the laser is operated such that the optical pumping power and average power of the laser radiation provide that the thermal-lensing effect is within the predetermined range. During the first step the laser radiation may be provided as CW radiation or as a train of pulses having a higher pulse-repetition rate than that of the processing pulses in the second step.

The method of the present invention is applicable to any laser processing operation that has a threshold power below which the processing operation can not be performed, and which would benefit from being performed by trains of pulses of equal peak power. Examples of such operations include but are not limited to precision micromachining, marking, stereo lithography, and hard-disk texturing.

One precision laser micromachining task may include drilling a series of holes specified to be identical in diameter and depth in a homogeneous material. A simple approach to this task involves using an equal number of pulses of equal energy at each hole site. Laser marking involves using a laser beam to form a plurality of spots over a surface. The spots my be arranged in the form of a detailed design or text, the quality of which is dependent on control of spot size. Stereolithography involves using a pulsed laser to selectively polymerize small volumes of a liquid plastic material to build up solid models. This may be done by rastering a focussed laser beam rapidly back and forth through the liquid plastic material while alternately turning the laser on an off to selectively expose only those volumes of the liquid required to build up a model. In hard disk texturing laser pulses are used to generate a plurality of bumps on the surface of a nickel phosphide coated disk. The bumps form a roughened area on the disk where read/write heads are "parked" when the disk is not in use. Because close clearances are involved between the read/write heads and the disk, it is particularly important that all bumps have a precisely controlled height.

The above discussed applications represent only a sample of material processing applications which would benefit from advantages offered by the method of the present invention. From this summary and the detailed description of the inventive method set forth below, those skilled in the art will recognize other such applications for which the inventive method would offer advantages without departing from the spirit and scope of the invention.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DESCRIPTION OF THE INVENTION

Figure 1:
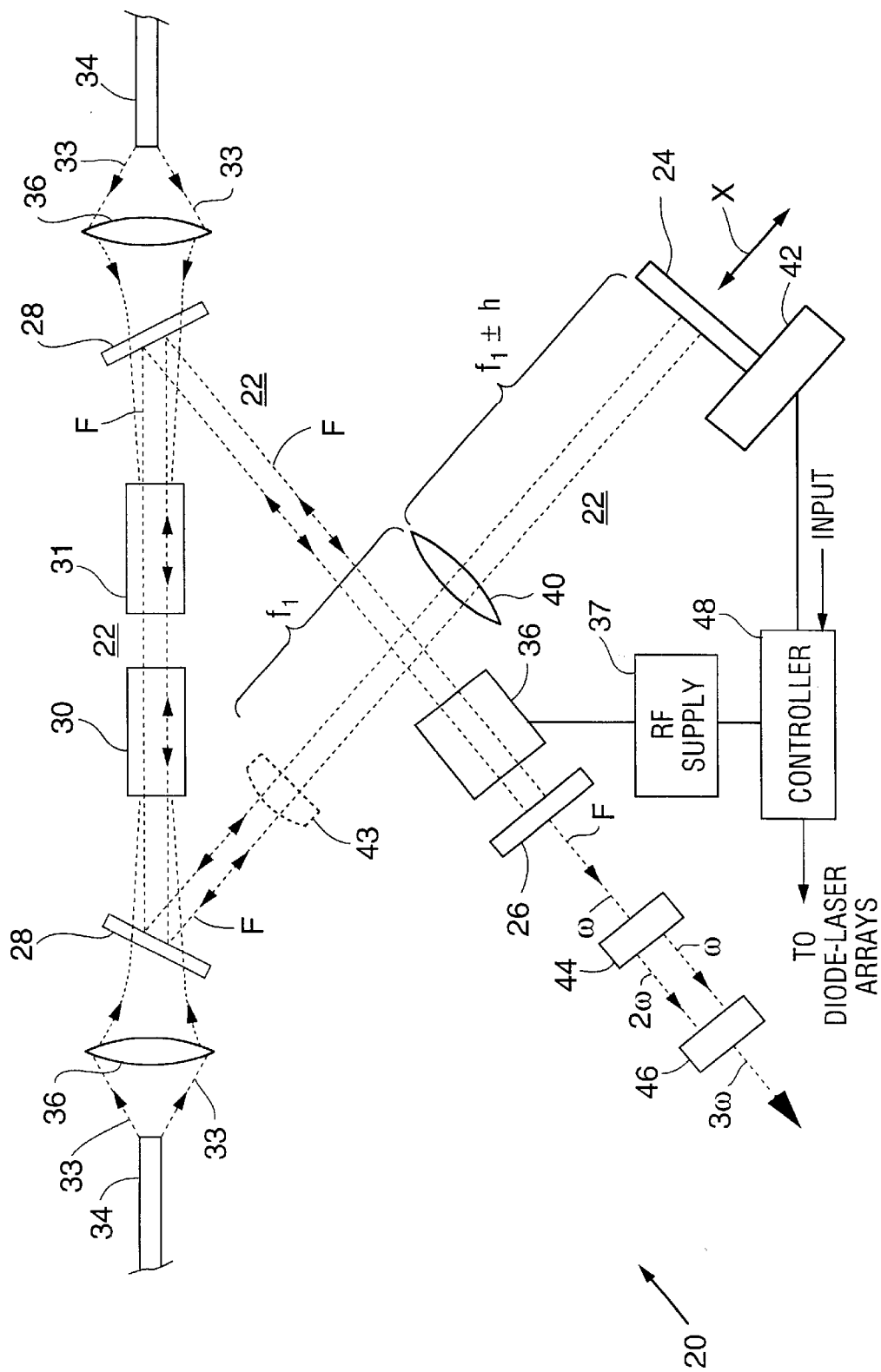
FIG. 1 schematically illustrates one preferred embodiment of a laser for performing a laser processing operation in accordance with the method of the present invention.

Turning now to the drawings, wherein like components are designated by like reference numerals, FIG. 1 schematically depicts one preferred embodiment of a laser 20 for performing a laser processing operation in accordance with the method of the present invention. Laser 20 includes a laser-resonator 22 terminated by a plane, maximally-reflecting mirror 24 and a partially-transmitting output-coupling mirror 26. Laser-resonator 22 is "folded" by fold-mirrors 28. Between fold mirrors 28 are located first and second gain-elements 30 and 31. Gain-elements 30 and 31 may be made from the same gain-medium or from different gain-media having characteristic emission wavelengths for laser radiation sufficiently close that the gain bandwidths thereof overlap. Gain-media 30 and 31 are optically pumped by light from a diode-laser arrays (not shown). Pump-light 33 from the diode laser arrays is transported by optical fibers 34 and focussed by lenses 36 through fold-mirrors 28 into the gain-media.

An optical switch or Q-switch 36, located in resonator 22, is operable to prevent or allow generation of laser radiation (as indicated by dotted lines F) by resonator 22, in response to continuous delivery to the gain-media of pump-light 33. Preferably, optical switch 36 is an acousto-optical switch including a piezo-electric element (not shown) driven by a radio-frequency (RF) voltage supply 37. Axial transmission through optical switch 36 for laser radiation F is controlled by the magnitude of RF voltage supplied to the switch. Preferably the switch is arranged to decrease in transmission with increasing RF voltage. With gain-media 30 and 31 continuously pumped, laser 20 can be operated in a pulsed-output (pulsed) mode by amplitude modulating the RF voltage at a desired pulse-repetition rate. Laser 20 can be operated in a continuous-wave (CW) mode by reducing the RF voltage to zero.

Optical switch 36 is defined herein as being open when it is does not introduce any significant loss in laser-resonator 22, which occurs when no RF voltage is applied. It is defined as being closed when sufficient loss is introduced, by application of RF voltage thereto, that lasing action is not possible in laser-resonator 22.

Preferred gain-media for gain-elements 30 and 31 are Nd:YAG and Nd:YVO$_4$ having a characteristic emission wavelength of about 1.06 micrometers ($\mu$m). Both of which, however, exhibit a strong thermal-lensing effect on optical pumping. The thermal-lensing effect for any particular gain-medium is dependent, inter alia, on the power of optical pump-light delivered to the gain-medium and the amount laser radiation extracted from the gain-medium by laser-resonator 22. The terminology "strong thermal-lensing effect" as used herein means that the thermal-lensing effect is sufficiently strong that a laser-resonator must be configured to compensate for this thermal-lensing effect for optimizing operation of the laser-resonator. In a resonator designed to deliver a wide range of power output, for example between about 2.0 and 20.0 Watts (W) of average power with similar mode properties, it has been found convenient to provide an arrangement for actively reconfiguring a laser-resonator to accommodate changes in thermal-lensing due to changes in pump-light power.

To this end, a positive lens 40 is provided in resonator 22 and mirror 24 is mounted on a translation stage 42 which allows the separation between mirror 24 and lens 40 to be axially varied as indicated by arrows X. The combination of mirror 24 and lens 40 create the effect of having resonator 22 terminated by a convex mirror 43 having a radius of curvature variable to accommodate thermal-lensing changes. Hypothetical convex mirror 43 is located at an axial distance $f_1$ from lens 40. Mirror 24 is separated from lens 40 by a distance $f_1$ plus or minus a variable distance (h). The effective radius (R*) of the hypothetical mirror 43 is given by an equation:

$$R^* = f_1^2 / h \tag{1}$$

The above description of compensation for thermal-lensing is provided merely for completeness of description. A more detailed description is not necessary for understanding principles of the present invention. Accordingly, no further description is presented herein. A complete description is provided in above referenced U.S. Pat. No. 5,912,912, the complete disclosure of which is hereby incorporated by reference.

It should be noted, here, that any particular setting of mirror 24 with respect to lens 40, i.e., any particular value of $f_1 \pm h$, will result in compensating resonator 22 for some range of values, for example about ±30% about a nominal value. Accordingly, laser-resonator 22 can have essentially the same output mode-shape within that range.

Continuing now with reference to FIG. 1, laser radiation F delivered by laser-resonator 22, via output-coupling mirror 26 thereof, passes through an optically-nonlinear element 44 located outside of laser-resonator 22. Laser radiation F is here designated as having a (fundamental) frequency $\omega$. A portion of the laser radiation is frequency-doubled by optically-nonlinear element 44 thereby generating radiation (second-harmonic radiation) having a frequency $2\omega$, i.e., having a wavelength one-half the wavelength of laser radiation F. Laser radiation F and the second-harmonic radiation are then mixed in a second optically-nonlinear crystal 46 thereby generating frequency-converted radiation having a frequency $3\omega$, i.e., having a wavelength one-third the wavelength of laser radiation F. Alternatively, the second-harmonic radiation alone can be directed into a different optically nonlinear-crystal to double the frequency of the second-harmonic radiation thereby generating fourth-harmonic radiation having a frequency $4\omega$, i.e., having a wavelength one-quarter the wavelength of laser radiation F. By way of example, 1.06 $\mu$m (near infrared or IR) laser radiation generated using a Nd:YAG or Nd:YVO$_4$ gain-element of elements can be frequency doubled and mixed to provide ultraviolet (UV) radiation having a wavelength of about 353 nanometers (nm). This is a preferred wavelength for laser machining of circuit boards.

Laser 20 is controlled by a controller 48 which includes a microprocessor (not shown). Controller 48 receives external input-data or uses internally programmed data to control, among other functions, pulse-repetition rate, duration of pulse trains, intervals between pulse-trains, and RF to optical switch 36. Controller 48 also controls operation of translation stage 42 for adjusting the position of mirror 24 relative to lens 40. This is done, in response to selected resonator operating parameters, using internally programmed data related to variation of thermal-lensing with changes in optical pump power. Such data can be readily determined by experiment, as is usual in the art, for a particular gain-medium and laser-resonator configuration. Here, it should be noted that while the method of the present invention is described in the context of a laser having a variable configuration, principles of the invention are equally applicable to a fixed resonator configuration corrected for only one range of thermal-lensing and having a correspondingly limited range of useful power output.

It is pointed out here that two gain-elements in a resonator are provided in laser-resonator 22 for reasons including an ability to mix gain-medium, conservative pumping of gain-elements, among others. Principles of the invention are applicable whether a resonator includes only one gain-element or more than two gain-elements. Accordingly, such an element or elements are alternatively, collectively referred to hereinafter as simply a gain-medium.

Figure 2:
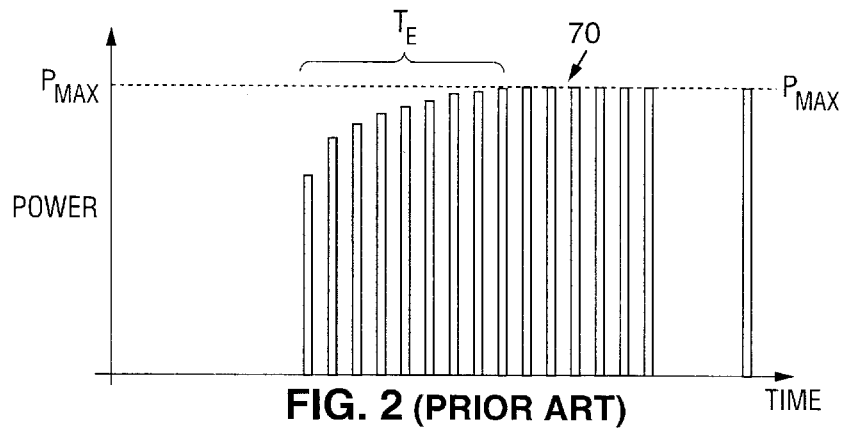
FIG. 2 is a bar graph schematically illustrating variation in peak power in the initial stage of a continuous train of pulses delivered by a prior art continuously-pumped pulsed-laser.

Continuing now with a description of the problem to which the method of the present invention is directed, FIGS. 2 and 3 depict variation in peak power in the initial stage of a continuous train of pulses 70 (see FIG. 2) and repeated trains or bursts of pulses 72 (see FIG. 3) delivered by a prior art continuously-pumped pulsed-laser. In each case, it is assumed that the gain-medium of the laser is continuously optically pumped at an essentially constant power throughout each train or burst, and for a period prior thereto longer than a thermal equilibration time of the gain-medium. It is also assumed that the resonator of the laser is compensated for an anticipated equilibrium value of thermal-lensing in the gain-medium consistent with optimum delivery of laser radiation therefrom.

Referring in particular to FIG. 2, prior to a time $T_O$ at which pulse-train 70 is initiated, thermal-lensing in the gain-medium would be at a maximum consistent with the power of pump-light delivered thereto, with no energy being extracted from the gain-medium as laser radiation. On initiation of pulse-train 70, laser energy is extracted from the gain-medium, and thermal-lensing progressively decreases over an equilibration period $T_E$, typically having a duration in the tens of milliseconds (ms). During this equilibration period, the peak power of pulses increases to a maximum $P_{MAX}$ which is the steady state maximum power, i.e., the maximum power possible for a given pump power with the laser-resonator properly compensated for the resulting, steady-state thermal lensing. At a time $T_O+T_E$, peak and average power in the pulse-train become essentially constant, i.e., constant within the normal noise characteristics of the laser.

Figure 3A:
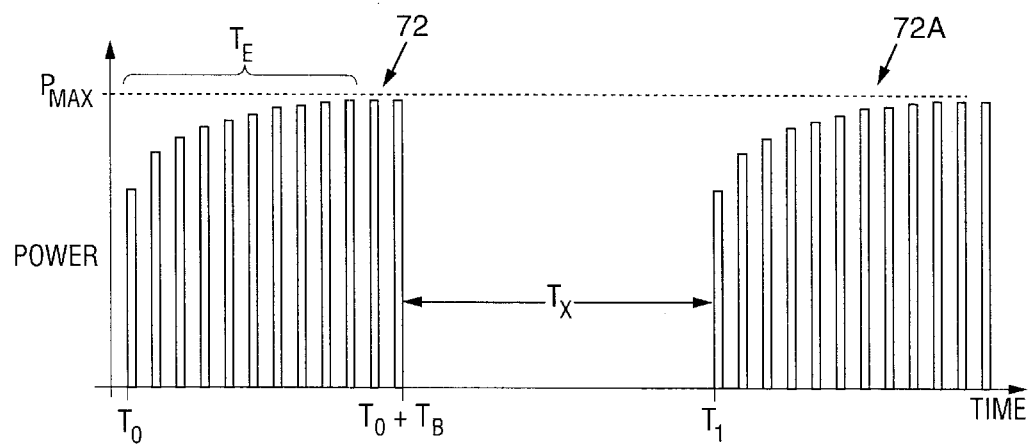
FIGS. 3A and 3B are bar graphs schematically illustrating variation in peak power in repeated trains or bursts of pulses delivered by a prior art continuously-pumped pulsed-laser.
Figure 3B:
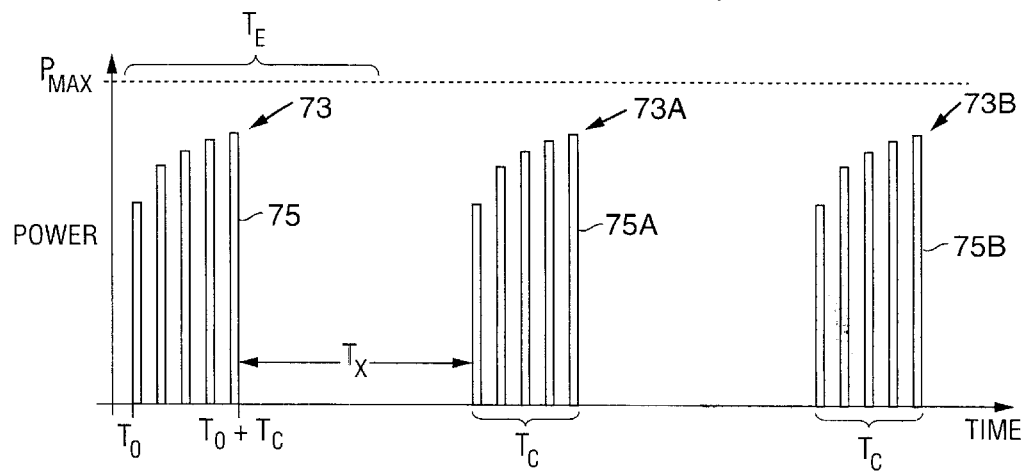

Referring in particular to FIGS. 3A and 3B, prior to a period $T_O$ at which train of pulses 72 is initiated, thermal-lensing in the gain-medium or media would again be at a maximum consistent with the power of pump-light delivered thereto. On initiation of the pulse-train 72, laser energy is now extracted from the gain-medium and thermal-lensing progressively decreases over an equilibration period $T_E$. During this equilibration period, the peak power of pulses increases to a maximum $P_{MAX}$. At a time $T_O+T_E$, peak and average power in the pulse-train become essentially constant as discussed above with reference to pulse-train 70.

Pulse-train 72 has a duration $T_B$. The pulse-train is considered to end at a time $T_O+T_B$. A time period $T_X$ between the end of one pulse-train 72 and the initiation of the next pulse-train 72A is assumed to be greater than the thermal equilibration time of the gain-medium, in which case, some time before the initiation of the pulse-train 72A, at time $T_1$, thermal-lensing would again be at a maximum. Following initiation of pulse 72A peak pulse power will rise as described above for peak 72.

Another significant disadvantage of this prior art arrangement is that if a train of pulses has a duration less than $T_E$, the peak pulse power will never reach the value $P_{MAX}$. This is illustrated in FIG. 3B wherein repeated pulse trains 73, 73A and 73B have a duration Tc which is less than equilibration time $T_E$. Here, it can be seen that even the pulses 75, 75A and 75B having the highest power have a peak power significantly less than $P_{MAX}$.

Variations in spatial properties of a laser beam corresponding to above-discussed thermal-lensing changes are not depicted herein. Those skilled in the art to which the present invention pertains will recognize that these will have similar transient dynamics to those illustrated in FIGS. 2 and 3 for peak power.

Before continuing with a detailed description of the method of the present invention, it is emphasized here that the resonator reconfiguring system described with reference to FIG. 1, or any similar scheme which is known in the art, is not practical for addressing the problems created by above-described repeated changes or transients of thermal-lensing effect. Similarly, repeatedly changing optical pumping power to compensate these repeated thermal lensing changes is impractical. This is because the response time of such schemes is too long. What is needed, and provided for by the method of the present invention, is an arrangement which will allow the thermal-lensing to anticipate and minimize the thermal-lensing change, essentially instantaneously, thereby stabilizing thermal-lensing in the gain-medium in a predetermined range for which a resonator is compensated, whether that be adjustably or fixedly compensated.

The method of the present invention for minimizing change in peak power stabilizes thermal-lensing by pumping the gain-medium with a substantially constant pump-power and extracting about the same average laser output-power from a gain-medium whether or not the laser is instantly performing a laser processing operation. During periods when the laser is not performing a laser operation, the laser is operated in a pulsed mode at a higher pulse-repetition rate than that at which it is operated when performing a laser operation, or is operated in a CW mode. The CW mode may be considered a limiting condition of continuously increasing pulse-repetition rate. Stabilizing the thermal-lensing contributes to providing an essentially constant peak pulse power or pulse energy during a processing operation.

Operating at the higher pulse-repetition rate or CW results in a lower peak power. In most pulsed laser processing operations, there can be defined a threshold pulse power below which a processing operation will not take place to a significant extent, if at all. In the method of the present invention, the laser is operated with peak pulse (output) power below this threshold operation between processing operations, however, at about the same average power as during a processing operation.

In a laser wherein frequency-conversion is used to provide pulsed harmonic output for laser processing, a greater difference between peak power in processing and non processing modes is possible by operating according to the method of the present invention. This is because the overall or average power frequency-conversion efficiency in optically-nonlinear elements of the type exemplified above, in an above described pulsed mode of operation of a laser such as laser 20, is directly dependent of the product of peak and average power in a train of laser radiation pulses being frequency converted. This product for any particular gain-medium is relatively sharply dependent on the repetition rate of pulses in a burst or train of pulses. Usually, for a given gain-medium, the peak of the peak*average power product occurs at a pulse-repetition rate slightly less than the pulse-repetition rate at which average power becomes essentially independent of pulse-repetition rate.

Figure 4:
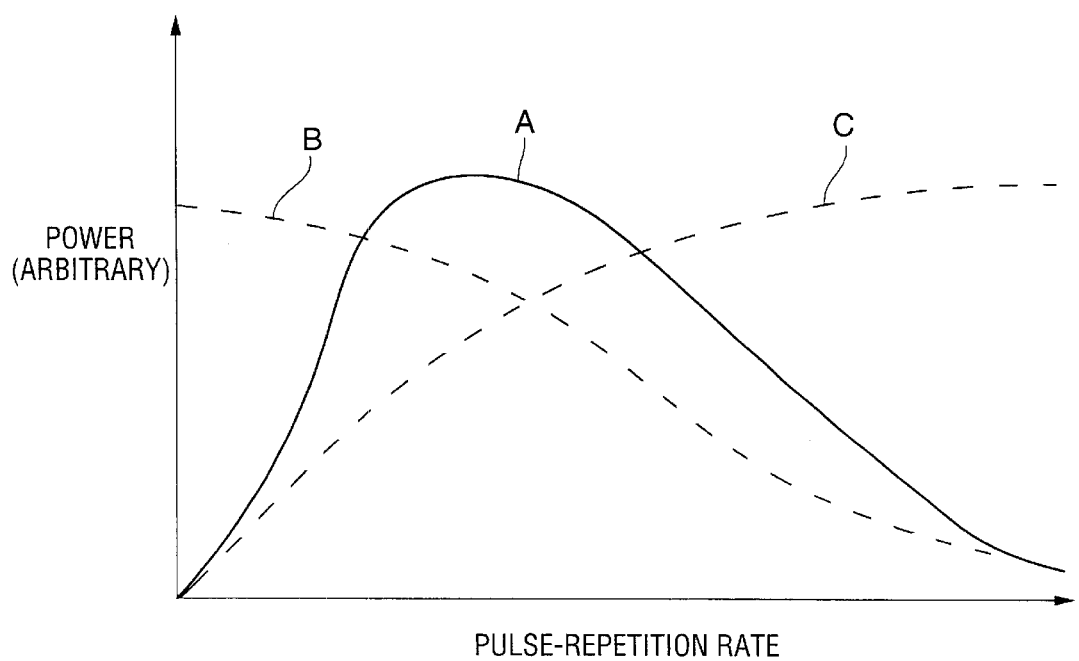
FIG. 4 is a graph schematically illustrating peak power, average power and the product of peak and average power delivered by the laser of FIG. 1 as a function of pulse-repetition rate.

FIG. 4 graphically illustrates the form of this variation of the peak*average power product with pulse-repetition rate (curve A) and the form of the variation of the peak power (curve B) and average power (curve C) of laser radiation with pulse-repetition rate. By way of example, Nd:YAG, and Nd:YVO$_4$ have peak*average power products peaking at a pulse-repetition rate of, respectively, about 10 KHz and about 20 KHz. It can be seen that at pulse-repetition rates greater than that range at which the peak*average power product is highest, average power rises relatively slowly toward a limiting value while peak power falls relatively rapidly and the peak*average power product and accordingly, conversion efficiency falls even more rapidly.

The method of the present invention can be realized in three operation modes. Prior to delivery of a pulse train from resonator 22 for a laser processing operation, Q-switch 36 is one (or more) of: periodically opened and closed to cause the resonator to deliver laser radiation pulses at a much higher pulse-repetition frequency; fully opened to cause the resonator to deliver CW radiation; or partially opened to deliver CW radiation at a lower power than in the fully opened condition, all at about the same average power as during a processing operation. This is described in detail below with reference to laser 20 of FIG. 1 which is arranged for frequency-converting the laser radiation.

Referring now to 5A–C, peak power of laser radiation delivered from resonator 22 (peak fundamental power, FIG. 5A), average (time averaged) power of laser radiation delivered from resonator 22 (average fundamental power, FIG. 5B), and peak harmonic power (FIG. 5C) generated by optically-nonlinear elements 44 and 46 in one example of operation of the laser of FIG. 1 in accordance with the method of the present invention are graphically depicted. Here, prior to initiating a pulse-train for performing a processing operation, optical switch 36 is operated such that laser-resonator 22 delivers a pulse-train 80 having a higher pulse-repetition rate than that of pulse-train 82 which has been selected for performing the processing operation (see FIG. 5A). Referring to FIG. 5B, pulse-train 80 delivers about the same average power (in practice somewhat higher) from the laser-resonator 22 as will be delivered by pulse-train 82 for performing the processing operation. The terminology "about the same" here means within a range $P_{AVERAGE} \pm \delta$ corresponding to the range of thermal-lensing for which resonator 22 is configured, i.e., effectively the same as far as thermal-lensing is concerned. This provides that thermal-lensing in gain-elements 30 and 31 is about the same, i.e., within the range of resonator compensation, during both pulse-trains. This essentially eliminates the above-described rise or ramp-up in peak power at the beginning of a processing pulse-train. Further as the gain medium is essentially constantly at an equilibrium thermal-lensing value peak power in a pulse train 82 will always be at a maximum possible value no matter how short the duration of the pulse-train.

The peak power of pulses (energy per pulse) in pulse-train 80 is lower than the peak power of pulses in pulse-train 82 as a result of the higher pulse-repetition rate of pulse-train 80. The lower peak power of pulse-train 80 results in a sufficient reduction in frequency-conversion efficiency in optically-nonlinear elements 44 and 46 that the peak frequency-converted power (energy per pulse) falls below a value $P_{THRESHOLD}$. Below this value, power is insufficient for a processing operation, for example, below an ablation threshold for a workpiece being machined. The increased reduction in peak power of third-harmonic radiation compared with fundamental (laser) radiation, in this example, results in part from the fact that two conversions are required to obtain the third-harmonic (UV) radiation. The reduction for only one conversion, for example to second harmonic can be expected to be somewhat less. Generally, the reduction ($R_H$) for a given harmonic conversion will be in proportion, all else being equal, to the reduction at the fundamental level to the power of the harmonic conversion, for example:

$$R_H \alpha R_F^H \qquad (2)$$

where $R_F$ is the reduction for the fundamental and H is an integer 2, 3, 4 ... N representing respectively second, third, fourth, and Nth harmonic conversions. Absolute values of harmonic power, or course, will be influenced, among other factors, by the particular optically-nonlinear material used for each conversion and the intensity of radiation in the material.

Preferably, the pulse-repetition rate of pulse-train 80 is at least two times greater than the pulse-repetition rate of pulse-train 80. By way of example in a laser 20 including a $YVO_4$ gain-medium that operates optimally at a pulse-repetition rate of about 20.0 KHz, delivering processing pulses at a peak power 50% above a threshold value for the processing, increasing the pulse-repetition rate in the non-processing pulse-train to greater than 60.0 KHz would reduce the peak power of non-processing pulses to a value about 30.0% or more below threshold.

Referring now to 6A–C, another example of operation of the laser of FIG. 1 in accordance with the method of the present invention is graphically depicted. Here, prior to initiating pulse-train 82 for performing the processing operation, resonator 22 is operated in a CW mode, for example, by shutting-off RF power to optical-switch 36 (see FIG. 6A). In the CW mode, of course, the peak power is essentially the average power (see FIG. 6B) depending on the noise characteristics of the laser. Here again, the CW (average) power can be expected to be somewhat higher than the average power in pulse-train 82, absent any measures to prevent this.

If it is found that in the CW mode the average power rises to a level where thermal-lensing can not be held at an effectively constant level between processing and non-processing modes, the CW power can be reduced by keeping the RF supply to optical switch 36 at a level which will introduce a sufficiently small loss in laser-resonator 22 that laser action is still possible, but occurs at a reduced CW power that effectively matches the average power in pulse-train 82. Optical switch 36 in this condition can be described as being partially open.

A particular advantage of operating in a CW mode is that harmonic conversion efficiency is lower than for pulsed-mode operation. This provides for a much lower peak harmonic power in a non-processing mode(see FIG. 6A) compared with the example of FIGS. 5A–C. The compounding effect of higher harmonic conversions will also be realized in this method of operation.

Figure 5A:
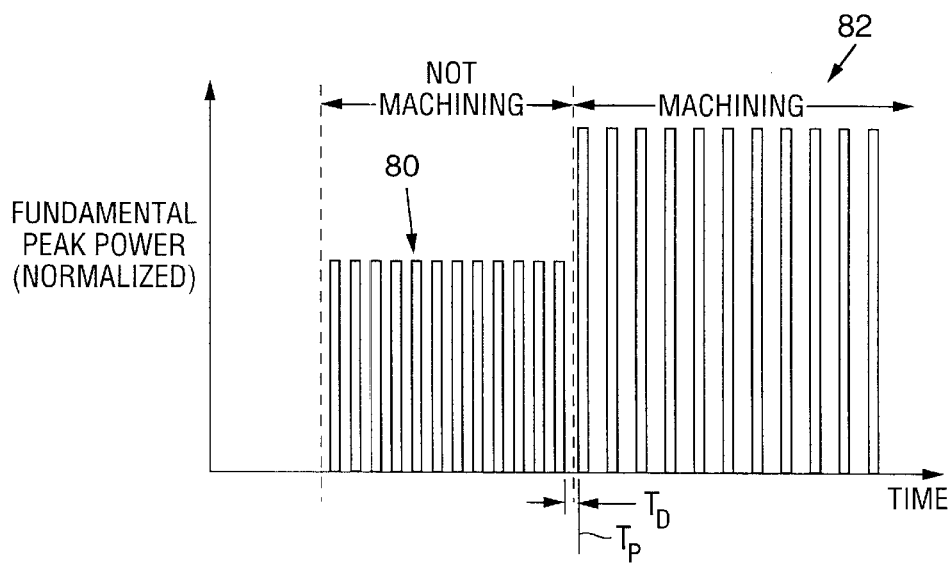
FIGS. 5A–C are graphs schematically illustrating peak fundamental power, average fundamental power, and peak harmonic power as a function of time in one example of operation of the laser of FIG. 1 in accordance with the method of the present invention.
Figure 5B:
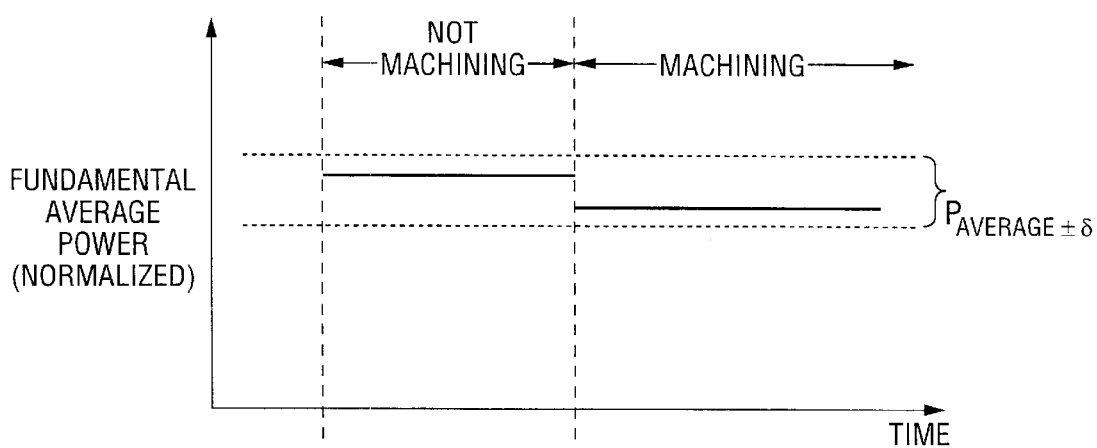
Figure 5C:
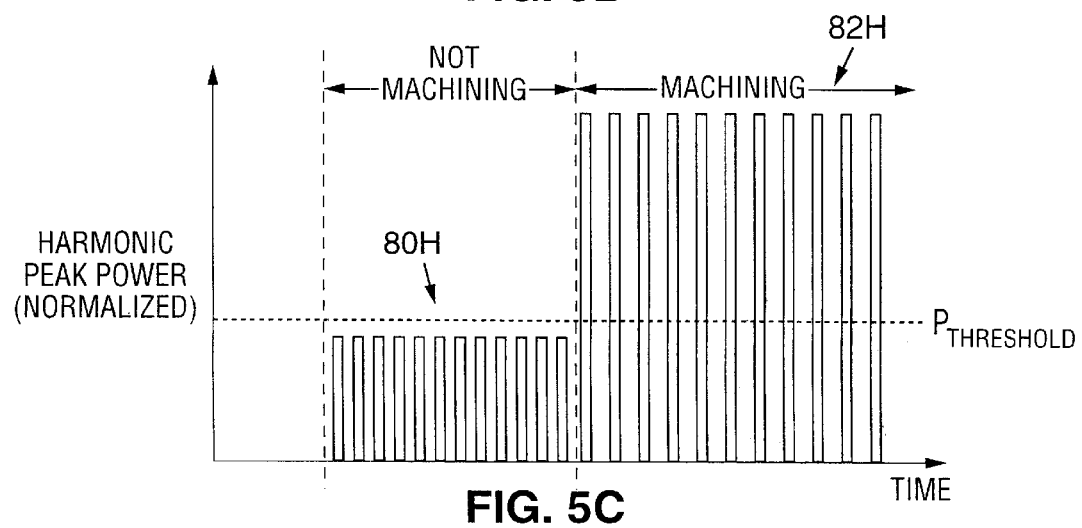
Figure 6A:
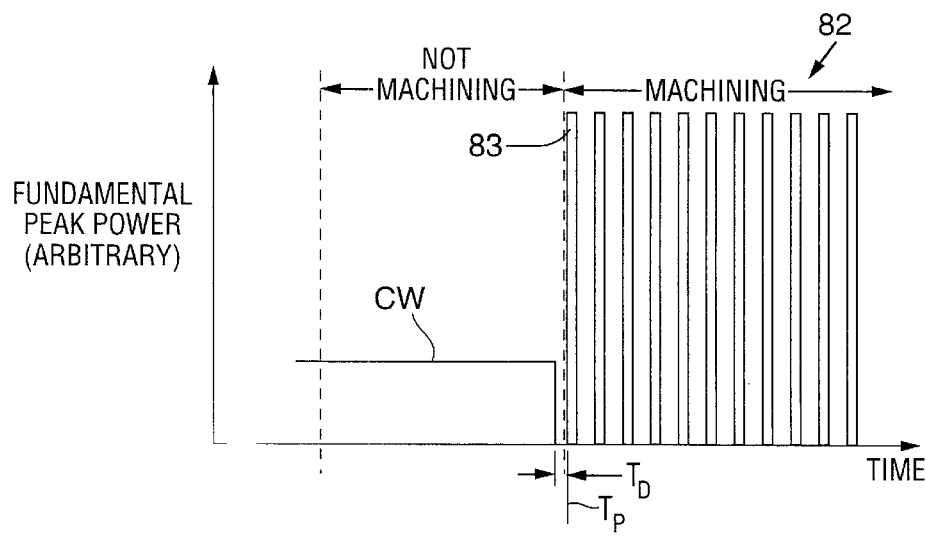
FIGS. 6A–C are graphs schematically illustrating peak fundamental power, average fundamental power, and peak harmonic power as a function of time in another example of operation of the laser of FIG. 1 in accordance with the method of the present invention.
Figure 6B:
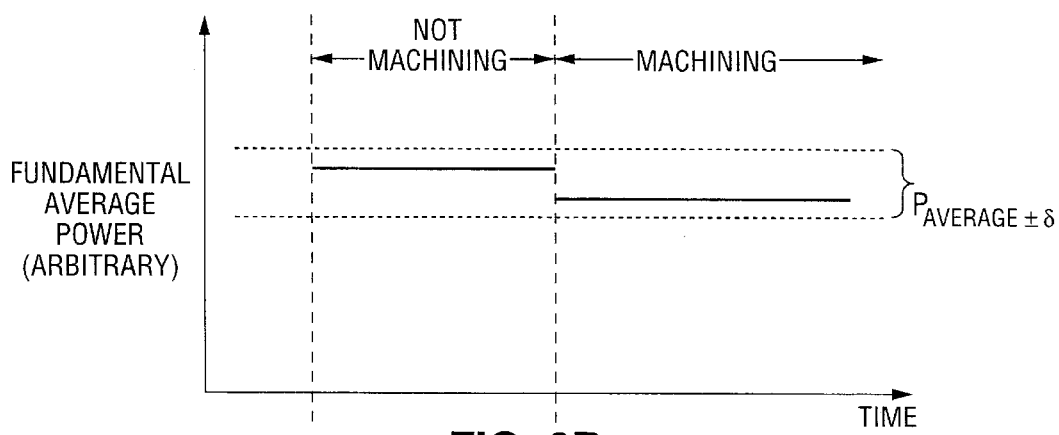
Figure 6C:
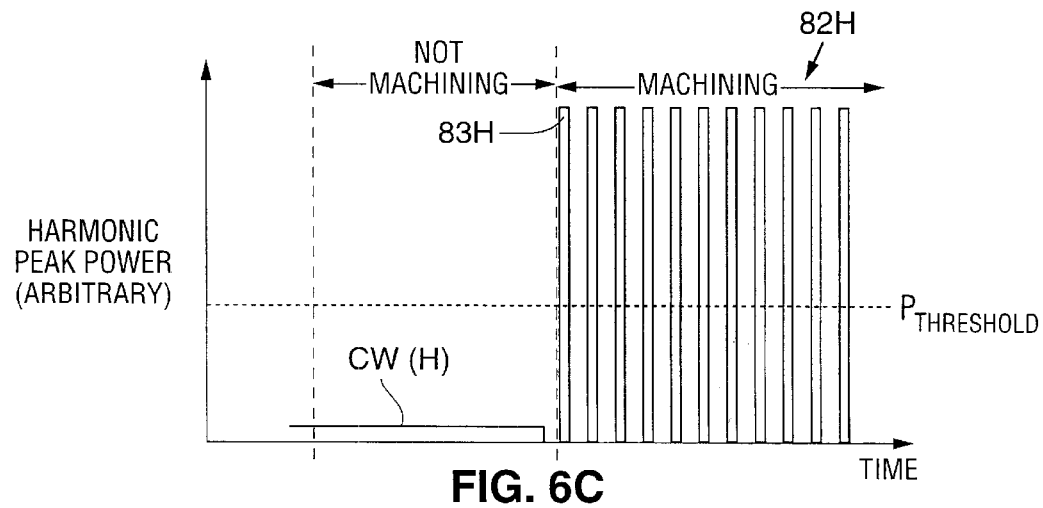
Figure 7A:
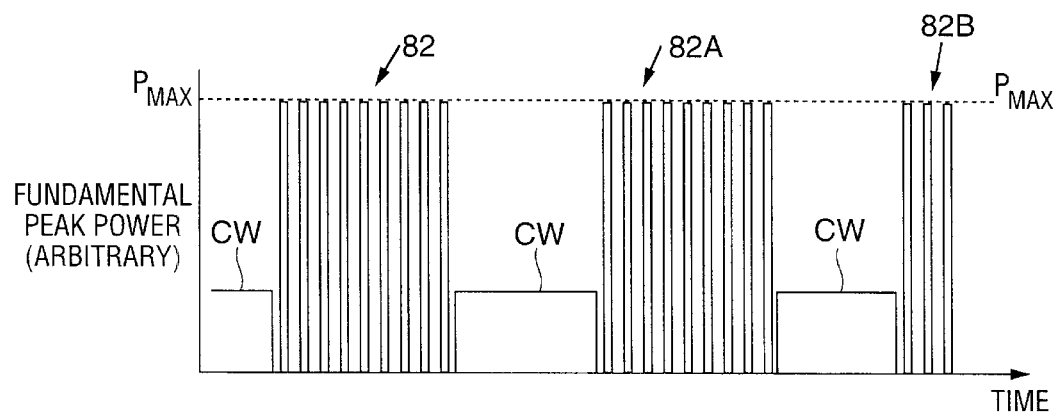
FIGS. 7A and 7B are graphs schematically illustrating peak fundamental power, average fundamental power, and thermal-lensing effect for a plurality of pulse-bursts in the example of FIGS 6A–C.
Figure 7B:
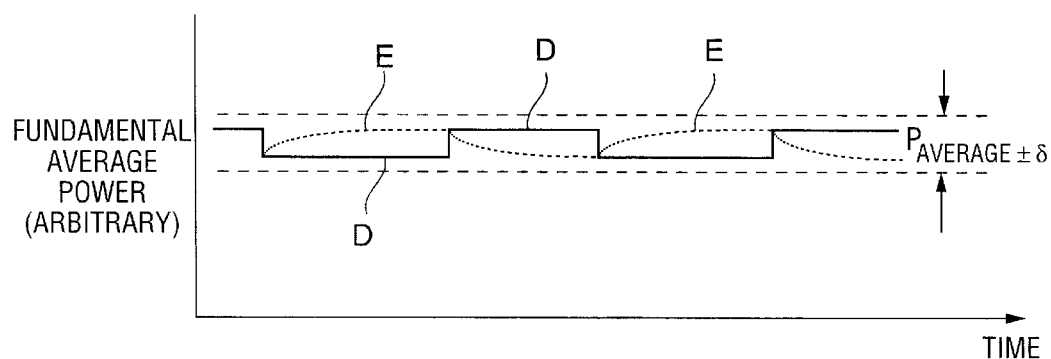

As depicted in FIGS. 5A and 6A, the non-processing pulse-train 80 or the CW radiation could represent a non-processing situation at the beginning of an extended train of processing pulses or between shorter trains of pulses 82. FIG. 7A, for completeness of description, depicts repeated bursts 82, 82A and 82B of processing pulses with CW operation of resonator 22 between the bursts. FIG. 7B depicts the corresponding average power variation with time as "square-wave" curve D. Dotted curve E depicts the corresponding fluctuation of thermal-lensing effect, which, as discussed above, is within a range which resonator 22 is configured to accommodate. As thermal-lensing remains within the compensated range whether or not processing pulses are being delivered all pulses in the bursts will have a peak power $P_{MAX}$ independent of the burst duration or the interval between bursts.

It is pointed out here that in the above described examples of operation of laser 20 in accordance with the method of the present invention, pump power to the gain-medium (for any number of gain-elements) is maintained at an essentially constant level. The terminology "essentially constant" here means within normal limits of electronic control. If the pump power is changed resonator 22 can be reconfigured as discussed above. That level of optical pumping power is sufficient, of course, to provide that, at the selected pulse-repetition rate of processing pulses, the pulses will have a peak power greater than $P_{THRESHOLD}$.

Continuing with reference again to FIGS 5A and 6A, in both above-described methods, it is important to pay attention to the condition of resonator 22 immediately prior to a time $T_P$ when the first pulse 83 of pulse-train 82 is initiated. Loss in the resonator must be adjusted such that the first-pulse 83 has the same peak power as all other pulses in the train. This loss can be created by applying RF power to optical switch 36 to close the switch for a delay time period $T_D$ before time $T_P$. This delay or lead time before the initial pulsing in pulse-train 83 will determine the amount of population inversion in the gain medium at the initiation of first pulse 83.

If the delay period $T_D$ is too long or too short, the first pulse would have respectively a significantly greater or lesser pulse energy than succeeding pulses, dependent on the time allowed for laser energy to be stored in the gain-medium. A pulse having greater energy is often referred to by practitioners of the art as a giant pulse. When repeated bursts of processing pulses are being delivered, a delay period after delivery of each processing pulse burst should be controlled to ensure that a giant pulse does not occur at the beginning of a non-processing interval.

One way of determining this delay time that has been found effective in either of the above examples of the inventive method of operating laser 20 is to assume that delay time $T_D$ is a linear function of the interval between pulses in a pulse-train 82, i.e., some constant times the interval between pulses, plus an offset time to accommodate any deviation in electronic control. The constant and the offset can be simply determined by experiment and controller 48 programmed to automatically set this delay time along according to a selected pulse-repetition rate. This may be done for example, using either a function or a look-up table, Preferably, the rise time of the RF voltage from zero to its set (closed) value should be included in delay time $T_D$. This rise time is typically a few tens of microseconds ($\mu s$).

In one example of a laser 20 operated in accordance with the method of the present invention, gain-elements 30 and 31 are each crystals of Nd:YVO$_4$. Each gain-element is optically-pumped by 13.5 W of light at a wavelength of 808 nm delivered from a diode-laser array. Laser radiation delivered by the resonator has a wavelength of 1.064 $\mu$m. Optically-nonlinear element 44 is a lithium borate (LBO) crystal arranged to frequency-double the 1.064 $\mu$m laser radiation. Optically-nonlinear element 46 is an LBO crystal arranged mix the frequency-doubled radiation with the 1.064 $\mu$m laser radiation providing third harmonic radiation having a wavelength of 355 nm.

At a repetition rate of 20 KHz, and an average power in a burst of pulses 82 of 9.0 W, third-harmonic average power in pulses 82H is 3.9 W. Peak harmonic power is about $10^4$ W and energy-per-pulse is about 185 microjoules ($\mu J$). In one mode, in between processing pulse-bursts, RF supply to optical switch is shut off to allow CW operation of resonator 22. Harmonic (average and peak) power in between processing bursts is 0.3 milliwatts (mW). In another operating mode, in between bursts of processing pulses, optical switch 36 is operated to provide "non-processing" pulses at a pulse-repetition rate of 100 KHz. Average harmonic power in these non-processing pulses is 0.5 W. Peak power is 100 W and pulse energy is about 5 $\mu J$.

In summary, the inventive method is described above in the context of performing laser-processing operations with an externally frequency-multiplied Q-switched, solid-state laser having a laser-resonator configured to accommodate a range of thermal-lensing effect in a solid-state gain-medium therein. The method of the present invention allows the frequency-multiplied (harmonic) output of the laser to be rapidly switched from a pulsed-mode having sufficient power to perform a laser processing operation, to another mode (pulsed or CW) having insufficient power to perform the processing operation. In the processing and non-processing modes, average fundamental power remains effectively equal, inasmuch as it remains within a relatively narrow range consistent with maintaining the thermal-lensing effect within the range for which the resonator is compensated. This contributes, in turn, to providing that peak pulse power remains essentially constant during a processing operation.

The method is effected via control of the Q-switch which also determines parameters of the pulsed output of a laser. Accordingly, switching between the processing and non-processing modes is accomplished essentially instantaneously and the method is applicable independent of the duration of bursts of processing pulses, pulse-repetition rate within the bursts of processing pulses and the interval between the bursts of pulses. This provides in turn that the method is applicable even in a case of a repeated sequence of such pulse-bursts including bursts of different duration and separation therebetween.

Generally, the present invention is described herein in terms a preferred and other embodiments. The invention, however, is not limited by the inventions described and depicted. Rather the invention is limited only by the claims appended hereto.

What is claimed is:

1. A method for operating laser for performing a laser processing operation, the laser having a laser-resonator including a gain-medium and one or more-optically nonlinear crystals located outside the resonator for converting laser radiation delivered by the resonator into frequency converted radiation, the power of the frequency-converted radiation being dependent on delivery parameters of the laser radiation from the laser-resonator, the gain-medium exhibiting a thermal-lensing effect on being optically pumped, said thermal-lensing being dependent on the difference between the power of the optical pumping and the average power of laser radiation delivered by the laser resonator, and with the resonator being configured to compensate for a predetermined range of the thermal-lensing, the method comprising the steps of:

(a) during the following steps, continuously optically pumping the gain medium at essentially constant power;

(b) providing a Q-switch in the resonator for operating the laser to deliver laser radiation in response to said continuous optical pumping;

(c) operating the laser via the Q-switch to deliver laser radiation to the one or more optically-nonlinear crystals in a first mode with delivery parameters thereof being such that frequency-converted radiation generated therefrom has insufficient peak power to perform the laser processing operation;

(d) following step (c), operating the laser via the Q-switch to deliver laser radiation to the one or more optically-nonlinear crystals in a second mode in the form of a train of pulses with delivery parameters thereof being such that pulses in a train of pulses of frequency-converted radiation have sufficient peak power to perform the laser processing operation; and (e) during steps (c) and (d) operating the laser via the Q-switch such that the difference between optical pumping power and average power of the laser radiation delivered by the laser resonator provide that the thermal-lensing effect is within the compensated range.

2. The method of claim 1, wherein laser radiation delivered in step (c) is CW radiation.

3. The method of claim 1, wherein laser radiation delivered in step (c) is in the form of a train of pulses, and the pulses-repetition rate of pulses in step (c) is greater than the pulse-repetition rate of pulses in step (d).

4. The method of claim 1, wherein steps (c), (d) and (e) are repeated a plurality of times, whereby the laser delivers repeated trains of pulses of frequency converted radiation of sufficient peak power to perform the laser processing operation with frequency converted radiation having insufficient power to perform the laser processing operation being delivered between said repeated trains of pulses.

5. A method for performing a laser processing operation, comprising the steps of:

(a) providing a laser resonator including a solid-state gain medium, said solid-state gain-medium exhibiting a thermal-lensing effect on being optically pumped, said thermal lensing effect being dependent on the difference between the power of said optically pumping and average power of the laser radiation extracted from said gain-medium;

(b) during the following steps continuously optically pumping the gain medium at an essentially constant power;

(c) providing a Q-switch for operating the laser resonator to deliver laser radiation in response to said continuous optical pumping;

(d) directing the laser radiation into one or more-optically nonlinear crystals located outside the resonator for converting laser radiation delivered by the resonator into frequency converted radiation, the power of the frequency-converted radiation being dependent on delivery parameters of the laser radiation from the laser-resonator;

(e) operating the laser resonator via said Q-switch to deliver laser radiation to said one or more optically nonlinear crystals in a first mode with delivery parameters thereof being such that frequency-converted radiation generated therefrom has insufficient peak power to perform the laser processing operation;

(f) following step (e) operating the laser via said Q-switch to deliver laser radiation to said one or more optically nonlinear crystals in a second mode in the form of a train of pulses with delivery parameters thereof being such that pulses in a train of pulses of frequency-converted radiation generated therefrom have sufficient peak power to perform the laser processing operation;

(g) during steps (e) and (f) operating the laser such that the difference between optical pumping power and average power of the laser radiation provide that the thermal-lensing effect remains within a predetermined range; and (h) controlling a delay time between steps (e) and (f), whereby all pulses delivered in step (f) have about the same peak power.

6. The method of claim 5, wherein laser radiation delivered in step (e) is CW radiation.

7. The method of claim 5, wherein laser radiation delivered in step (e) is in the form of a train of pulses, and the pulses-repetition rate of pulses in step (e) is greater than the pulse-repetition rate of pulses in step (f).

8. The method of claim 5, wherein steps (e), (f), and (g) are repeated a plurality of times, whereby the laser delivers repeated trains of pulses of frequency converted radiation of sufficient peak power to perform the laser processing operation, with frequency-converted radiation having insufficient power to perform the laser processing operation being delivered between said repeated trains of pulses.

9. The method of claim 8, wherein independent of the duration of steps (e) and (f) pulses in each of said trains of pulses each have about the same peak power.

10. A method of operating a laser, the laser having a laser-resonator including a gain-medium said gain medium exhibiting thermal lens effects on being optically pumped, said laser resonator including a Q-switch for operating the resonator to generate laser output pulses for treating a workpiece, said method comprising:

during the following steps continuously optically pumping the gain medium at essentially constant power;

operating the Q-switch in a first mode to generate repeated sequences of bursts of output pulses having a peak power sufficient to treat the workpiece; and operating the Q-switch in a second mode to generate a laser output between said sequences of bursts in order to maintain the thermal lens effects in the gain medium substantially similar to when the bursts are being generated during the first mode, and wherein the laser output during the second mode has a peak power insufficient to treat the workpiece.

11. A method as recited in claim 10, wherein when said Q-switch is operated in the second mode, the output of the laser is in a continuous form.

12. A method as recited in claim 10, wherein when said Q-switch is operated in the second mode, the output of the laser is in a pulsed form.

13. A method as recited in claim 12, wherein the repetition frequency of the pulses is higher in the second mode than in the first mode.

14. A method as recited in claim 10, wherein the output pulses are directed through one or more nonlinear crystals for increasing the frequency thereof prior to treating the workpiece.

15. A method as recited in claim 10, wherein each of the output pulses generated during the first mode have substantially the same peak power.

* * * * *

UNITED STATES PATENT AND TRADEMARK OFFICE
CERTIFICATE OF CORRECTION

PATENT NO.     : 6,414,980 B1
DATED          : July 2, 2002
INVENTOR(S)    : Charles Xiaoyi Wang et al.

It is certified that error appears in the above-identified patent and that said Letters Patent is hereby corrected as shown below:

<u>Title page,</u>
Item [75],Inventors, should read as follows:
-- [75] Inventors:   Charles Xiaoyi Wang, Santa Clara; Acle V. Hicks, Cupertino; Edward C. Rea, Jr., Palo; Mark M. Gitin, Mountain View, all of CA (US) --

Signed and Sealed this

Twenty-ninth Day of June, 2004

JON W. DUDAS
*Acting Director of the United States Patent and Trademark Office*